US010054826B2

(12) United States Patent
Ashizawa et al.

(10) Patent No.: US 10,054,826 B2
(45) Date of Patent: *Aug. 21, 2018

(54) LIQUID CRYSTAL DISPLAY DEVICE

(71) Applicants: Japan Display Inc., Tokyo (JP);
Panasonic Liquid Crystal Display Co., Ltd., Hyogo-ken (JP)

(72) Inventors: Keiichiro Ashizawa, Mobara (JP);
Mitsuo Nakatani, Mobara (JP);
Hiroaki Miwa, Yokohama (JP); Takao Tanaka, Yachimata (JP); Sadafumi Hirai, Mobara (JP); Shinichi Kawabe, Yokohama (JP); Makoto Sasaki, Mobara (JP); Kazuyuki Ito, Mobara (JP); Masahiro Ieda, Oomishirasato (JP)

(73) Assignees: Japan Display Inc., Tokyo (JP);
Pansonic Liquid Crystal Display Co., Ltd., Himeji-shi, Hyogo-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/394,082

(22) Filed: Dec. 29, 2016

(65) Prior Publication Data

US 2017/0108730 A1   Apr. 20, 2017

Related U.S. Application Data

(63) Continuation of application No. 14/718,210, filed on May 21, 2015, now Pat. No. 9,575,378, which is a (Continued)

(30) Foreign Application Priority Data

Oct. 27, 2003   (JP) .................. 2003-365378

(51) Int. Cl.
G02F 1/1339   (2006.01)
G02F 1/1362   (2006.01)

(52) U.S. Cl.
CPC .... G02F 1/13394 (2013.01); G02F 1/136286 (2013.01)

(58) Field of Classification Search
CPC .................. G02F 1/13394; G02F 1/13392
See application file for complete search history.

(56) References Cited

U.S. PATENT DOCUMENTS 7,133,108 B2   11/2006   Shimizu et al.
7,385,666 B2    6/2008   Ashizawa et al.
(Continued)

FOREIGN PATENT DOCUMENTS

CN   1605907 A    4/2005
JP   10-253967 A   9/1998
(Continued)

*Primary Examiner* — Dung Nguyen
(74) *Attorney, Agent, or Firm* — Juan Carlos A. Marquez; Marquez IP Law Office, PLLC

(57) ABSTRACT

A liquid crystal display device with a pair of substrates which are arranged to face each other with liquid crystal therebetween, columnar spacers having the substantially equal height formed on a liquid-crystal-side surface of one substrate, and the columnar spacers include the columnar spacer which is contact with a liquid-crystal-side surface of another substrate and the columnar spacer which is not contact with the liquid-crystal-side surface of another substrate.

7 Claims, 5 Drawing Sheets

Related U.S. Application Data continuation of application No. 14/229,646, filed on Mar. 28, 2014, now Pat. No. 9,069,213, which is a continuation of application No. 13/771,801, filed on Feb. 20, 2013, now Pat. No. 8,724,072, which is a continuation of application No. 12/926,769, filed on Dec. 8, 2010, now Pat. No. 8,405,813, which is a continuation of application No. 12/458,090, filed on Jun. 30, 2009, now Pat. No. 7,872,725, which is a continuation of application No. 12/149,581, filed on May 5, 2008, now Pat. No. 7,773,189, which is a continuation of application No. 10/969,042, filed on Oct. 21, 2004, now Pat. No. 7,385,666.

(56) References Cited

U.S. PATENT DOCUMENTS

| | | |
|---|---|---|
| 7,561,245 B2 | 7/2009 | Oh et al. |
| 7,773,189 B2 | 8/2010 | Ashizawa et al. |
| 7,872,725 B2 | 1/2011 | Ashizawa et al. |
| 8,405,813 B2 | 3/2013 | Ashizawa et al. |
| 8,629,447 B2 | 1/2014 | Baek |
| 8,778,711 B2 | 7/2014 | Baek et al. |
| 9,069,213 B2 | 6/2015 | Ashizawa et al. |
| 9,575,378 B2 * | 2/2017 | Ashizawa ............ G02F 1/13394 |
| 2001/0026347 A1 | 10/2001 | Sawasaki |
| 2002/0075443 A1 | 6/2002 | Shimizu et al. |
| 2004/0114087 A1 | 6/2004 | Cho et al. |
| 2005/0185130 A1 | 8/2005 | Oh et al. |
| 2006/0203178 A1 | 9/2006 | Cho et al. |

FOREIGN PATENT DOCUMENTS

| | | |
|---|---|---|
| JP | 2001-133787 A | 5/2001 |
| JP | 2002-182220 A | 6/2002 |
| JP | 2003-131238 A | 5/2003 |

* cited by examiner

LIQUID CRYSTAL DISPLAY DEVICE

CROSS REFERENCE TO RELATED APPLICATIONS

1. Technical Field

This application is a Continuation application of U.S. application Ser. No. 14/718,210, filed May 21, 2015, which is a Continuation of U.S. application Ser. No. 14/229,646 filed Mar. 28, 2014, which is a Continuation application of U.S. application Ser. No. 13/771,801 filed Feb. 20, 2013, which is a Continuation application of U.S. application Ser. No. 12/926,769 filed Dec. 8, 2010, which is a Continuation application of U.S. application Ser. No. 12/458,090 filed Jun. 30, 2009, which is a Continuation application of U.S. application Ser. No. 12/149,581 filed May 5, 2008, which is a Continuation application of U.S. application Ser. No. 10/969,042 filed Oct. 21, 2004. Priority is claimed based on U.S. application Ser. No. 14/718,210, filed May 21, 2015, which claims priority to U.S. application Ser. No. 14/229,646 filed Mar. 28, 2014, which claims priority to U.S. application Ser. No. 13/771,801 filed Feb. 20, 2013, which claims priority to U.S. application Ser. No. 12/926,769 filed Dec. 8, 2010, which claims priority to U.S. application Ser. No. 12/458,090 filed Jun. 30, 2009, which claims priority to U.S. application Ser. No. 12/149,581 filed May 5, 2008, which claims the priority date of U.S. application Ser. No. 10/969,042 filed Oct. 21, 2004, which claims the priority date of Japanese Application No. 2003-365378 filed on Oct. 27, 2003, and which is hereby incorporated by reference.

BACKGROUND OF THE INVENTION

1. Field of the Invention

The present invention relates to a liquid crystal display device, and more particularly to so-called columnar spacers which are formed for ensuring a gap between respective substrates which are arranged to face each other in an opposed manner with a liquid crystal therebetween.

2. Description of the Related Art

In the liquid crystal display device, to ensure a gap between respective substrates which are arranged to face each other in an opposed manner with liquid crystal therebetween, spacers are interposed between the respective substrates. As such spacers, there have been known spacers which are referred to as columnar spacers, for example.

That is, a layer formed of resin, for example, is formed on a liquid-crystal-side surface of one substrate out of the respective substrates, wherein the layer is formed by a selective etching method. Accordingly, this method has an advantage that the necessary number of columnar spacers can be formed at necessary portions between the substrates.

However, in the liquid crystal display device having such a constitution, the friction resistance between the columnar spacers and another substrate which is brought into contact with the columnar spacers is increased and hence, when another substrate is displaced in the planar direction with respect to one substrate, there may be a case that the displacement is not restored and the brightness irregularities attributed to the displacement between a pixel region of the upper substrate and a pixel region of the lower substrate is generated.

Further, Japanese Unexamined Patent Publication 2003-131238 discloses an example which includes columnar spacers which differ in height as a state of the columnar spacers in the manufacturing steps.

SUMMARY OF THE INVENTION

However, the liquid crystal display device having such a constitution has a drawback that it is necessary to form the respective columnar spacers which differ in height and the irregularities of accuracy of these spacers are large.

The present invention has been made in view of such circumstances and it is an advantage of the present invention to provide a liquid crystal display device which is capable of coping with the displacement in the lateral direction and an excessive pressure applied to substrates without increasing manufacturing steps, for example.

To briefly explain examples of representative inventions among the inventions disclosed in this specification, they are as follows.

(1) The liquid crystal display device according to the present invention is, for example, a pair of substrates which are arranged to face each other with liquid crystal therebetween, columnar spacers having the substantially equal height formed on a liquid-crystal-side surface of one substrate, and the columnar spacers include the columnar spacer which is contact with a liquid-crystal-side surface of another substrate and the columnar spacer which is not contact with the liquid-crystal-side surface of another substrate.

(2) The liquid crystal display device according to the present invention is, for example, a pair of substrates which are arranged to face each other with liquid crystal therebetween, columnar spacers having the substantially equal height formed on a liquid-crystal-side surface of one substrate, the columnar spacers include the columnar spacer which is contact with a liquid-crystal-side surface of another substrate and the columnar spacer which is not contact with the liquid-crystal-side surface of another substrate, and the columnar spacers are arranged such that the around the respective columnar spacers which are brought into contact with the liquid-crystal-side surface of another substrate, the columnar spacers which are not brought into contact with the liquid-crystal-side surface of another substrate are arranged.

(3) The liquid crystal display device according to the present invention is, for example, a pair of substrates which are arranged to face each other with liquid crystal therebetween, columnar spacers formed on a liquid-crystal-side surface of one substrate, and the columnar spacers include first columnar spacer and second columnar spacer, and a liquid-crystal-side surface of another substrate where the first columnar spacer contact has a projecting shape.

(4) The liquid crystal display device according to the present invention is, for example, a pair of substrates which are arranged to face each other with liquid crystal therebetween, columnar spacers formed on a liquid-crystal-side surface of one substrate, and the columnar spacers include first columnar spacer and second columnar spacer, and portion of another substrate which face the first columnar spacer is set higher than portion of another substrate which face the second columnar spacer.

(5) The liquid crystal display device according to the present invention is, for example, on the premise of the above-mentioned constitution (3), the projecting shape of the liquid-crystal-side surface of another substrate with which the first columnar spacer contact is formed by a material having a thickness interposed as a layer below an insulation film.

(6) The liquid crystal display device according to the present invention is, for example, on the premise of the above-mentioned constitution (4), the portion of another substrate which face the first columnar spacer in an opposed manner is formed by a material having a thickness interposed as a layer below an insulation film.

(7) The liquid crystal display device according to the present invention is, for example, a pair of substrates which are arranged to face each other with liquid crystal therebetween, columnar spacers formed on a liquid-crystal-side surface of one substrate, and the columnar spacers include first columnar spacer and second columnar spacer, and surfaces of another substrate which face the second columnar spacer have a recessed shape.

(8) The liquid crystal display device according to the present invention is, for example, on the premise of the above-mentioned constitution (3), the first columnar spacer is arranged such that the second columnar spacers are provided around the first columnar spacer.

(9) The liquid crystal display device according to the present invention is, for example, on the premise of the above-mentioned constitution (4), the respective first columnar spacer is arranged such that the second columnar spacers are provided around the first columnar spacer.

(10) The liquid crystal display device according to the present invention is, for example, a pair of substrates which are arranged to face each other with liquid crystal therebetween, at least a thin film transistor formed on one substrate in each pixels and the thin film transistor have semiconductor layer, columnar spacers formed on another substrate, and having another semiconductor layer which is spaced apart from the semiconductor layer of the thin film transistor in plane view, and the columnar spacers include at least a columnar spacer arranged in a manner to face the another semiconductor layer and at least a columnar spacer arranged in a manner not to face the another semiconductor layer.

(11) The liquid crystal display device according to the present invention is, for example, on the premise of the above-mentioned constitution (10), the another semiconductor layers are formed over gate signal lines which drive the thin film transistors of the respective pixels.

(12) The liquid crystal display device according to the present invention is, for example, on the premise of the above-mentioned constitution (10), the respective columnar spacers have the substantially equal height.

(13) The liquid crystal display device according to the present invention is, for example, on the premise of the above-mentioned constitution (10), the another semiconductor layers are formed in the same step as the semiconductor layers of the thin film transistors.

(14) The liquid crystal display device according to the present invention is, for example, on the premise of the above-mentioned constitution (10), another semiconductor layers constitute the same layers as the semiconductor layers of the thin film transistors.

(15) The liquid crystal display device according to the present invention is, for example, on the premise of the above-mentioned constitution (10), diameter of the columnar spacer arranged in a manner not to face the another semiconductor layer is greater than a columnar spacer arranged in a manner to face the another semiconductor layer.

(16) The liquid crystal display device according to the present invention is, for example, on the premise of the above-mentioned constitution (4), the difference in height between the portions of another substrate which face the first columnar spacers in an opposed manner and the portions of another substrate which face the second columnar spacers in an opposed manner is equal to or more than 0.06 μm and equal to or less than 0.18 μm.

(17) The liquid crystal display device according to the present invention is, for example, on the premise of the above-mentioned constitution (10), the difference in height between the portions of one substrate where another semiconductor layer is formed and the portions of one substrate where another semiconductor layer is not formed is equal to or more than 0.06 μm and equal to or less than 0.18 μm.

Here, the present invention is not limited to the above-mentioned constitutions and various modifications can be made without departing from the technical concept of the present invention.

In the liquid crystal display device having such a constitution, for one substrate on which the columnar spacers are formed, another substrate on which the columnar spacers are not formed is provided, and the columnar spacers include the columnar spacers which are brought into contact with another substrate and the columnar spacers which are not brought into contact with another substrate and hence, it is possible to largely reduce the friction resistance against the displacement in plane of another substrate with respect to one substrate.

Accordingly, even when such a displacement is generated, another substrate can easily return to the original position and hence, it is possible to obviate a phenomenon that the displacement is maintained so that the brightness irregularities occur.

Further, when an excessive pressure is exerted between another substrate and one substrate, the columnar spacers which have not been brought into contact with another substrate so far are also brought into contact with another substrate and hence, the columnar spacers can sufficiently withstand the excessive pressure thus ensuring the gap between both substrates.

Further, since the respective columnar spacers can be formed with their height set substantially equal, the increase of the manufacturing cost of the liquid crystal display device can be prevented.

DETAILED DESCRIPTION OF THE INVENTION

Preferred embodiments of the liquid crystal display device of the present invention are explained hereinafter in conjunction with drawings.

Figure 1:
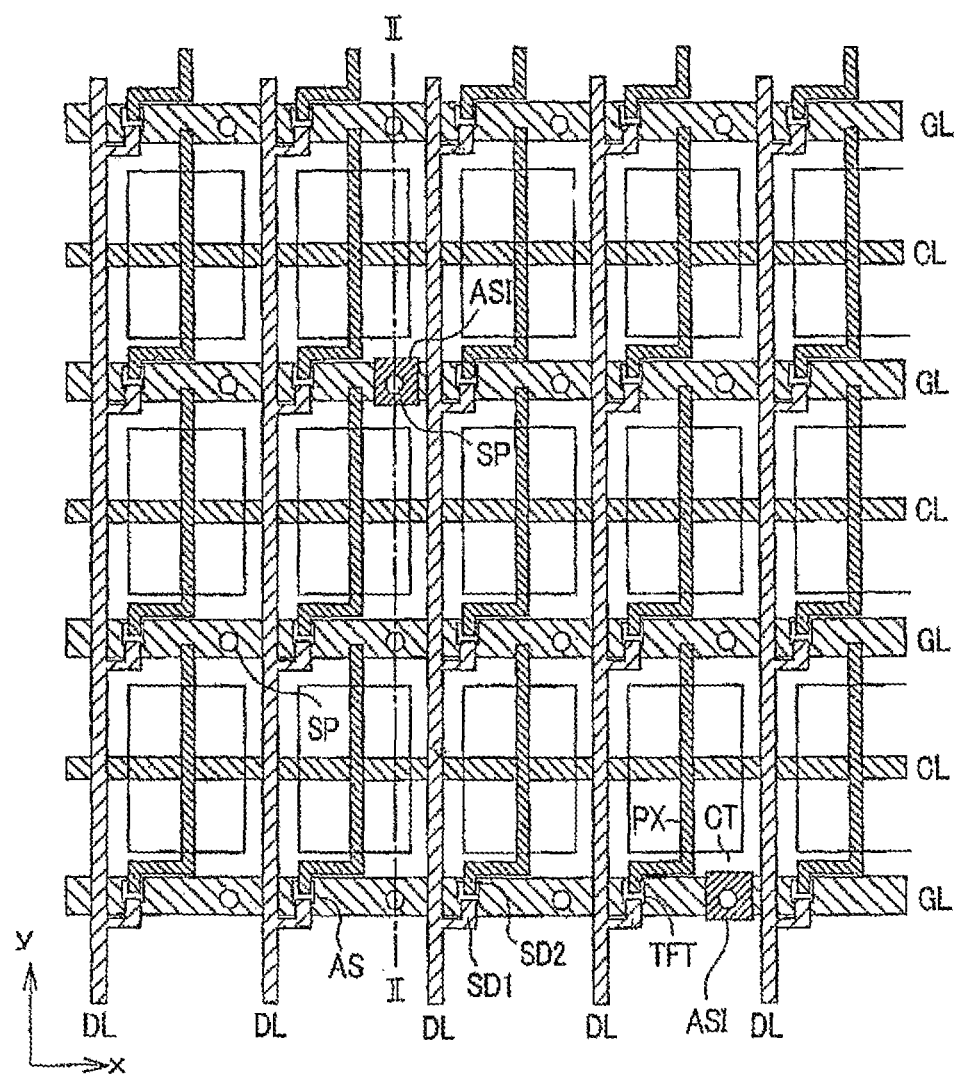
FIG. 1 is a plan view showing an embodiment of the constitution of pixels of a liquid crystal display device according to the present invention.
Figure 2:
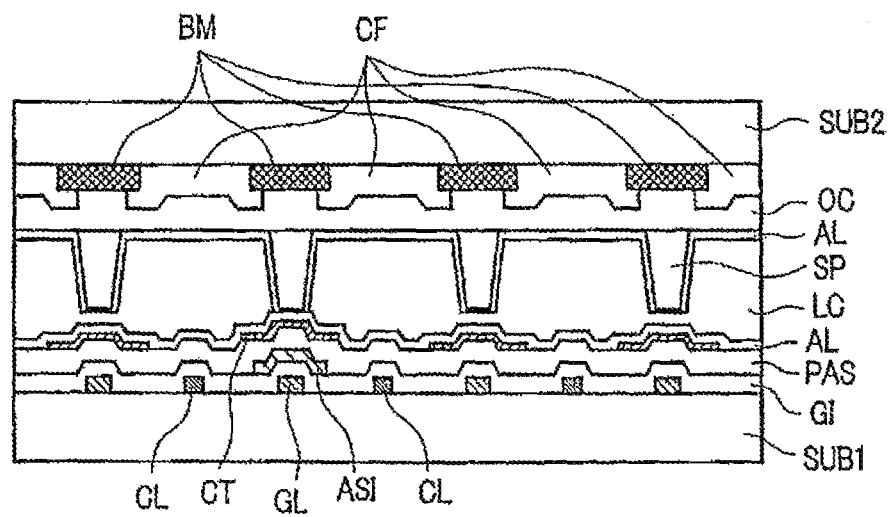
FIG. 2 is a cross-sectional view taken along a line II-II in FIG. 1.

FIG. 1 is a constitutional view of an essential part of a display part showing one embodiment of the liquid crystal display device according to the present invention and also is a view which shows the constitution of a liquid-crystal-side surface of one substrate out of a pair of substrates which are arranged to face each other in an opposed manner with liquid crystal therebetween. Further, FIG. 2 is a cross-sectional view taken along a line II-II in FIG. 1.

On the liquid-crystal-side surface of the first substrate SUB1, first of all, the gate signal lines GL which extend in the x direction and are arranged in parallel in the y direction are formed.

These gate signal lines GL surround rectangular regions together with drain signal lines DL described later and these regions constitute pixel regions.

Further, in a region defined between the respective gate signal lines GL, a counter voltage signal line CL which is arranged parallel to the gate signal line GL is formed. The counter voltage signal line CL is connected with the counter electrode CT described later and a reference voltage signal (which becomes the reference with respect to the video signal) is applied to the counter electrode CT through the counter voltage signal line CL.

On a surface of the substrate SUB1 on which the gate signal lines GL and the counter voltage signal lines CL are formed, an insulation film GI made of SiN, for example, is formed such that the insulation film GI also covers the gate signal lines GL and the counter voltage signal lines CL.

The insulation film GI has a function of an interlayer insulation film with respect to the gate signal lines GL and the counter voltage signal lines CL in the regions where the drain signal lines DL described later are formed, has a function of a gate insulation film in the regions where the thin film transistors TFT described later are formed, and has a function of a dielectric film in the region where capacitive elements Cstg described later are formed.

Then, on a surface of the insulation film GI, semiconductor layers AS made of amorphous Si, for example, are formed such that the semiconductor layers AS are overlapped to portions of the gate signal lines GL.

The semiconductor layers AS are semiconductor layers of the thin film transistors TFT, wherein by forming a drain electrode SD1 and a source electrode SD2 on each semiconductor layer AS, it is possible to constitute a MIS type transistor having the inversely staggered structure which uses a portion of the gate signal line as a gate electrode.

Here, the drain electrodes SD1 and the source electrodes SD2 are formed simultaneously with the formation of the drain signal lines DL.

That is, the drain signal lines DL which extend in the y direction in parallel and are arranged in the x direction are formed, portions of the drain signal lines DL extend to upper surfaces of the semiconductor layers AS thus forming the drain electrodes SD1 and, at the same time, the source electrodes SD2 are formed in a spaced-apart manner from the drain electrodes SD1 by an amount of a channel length of the thin film transistors TFT.

The source electrode SD2 is formed such that the source electrode SD2 extends into the inside of the pixel from the semiconductor layer AS surface and traverses a center portion of the pixel in the y direction. The extension portion functions as the pixel electrode PX and generates an electric field between the pixel electrode PX and the counter electrode CT described later, and the optical transmissivity of the liquid crystal is controlled based on this electric field.

In forming the pixel electrode PX, the pixel electrode PX is overlapped to the counter voltage signal line CL by way of the insulation film GI and a capacitive element Cstg which adopts the insulation film GI as a dielectric film is formed between the pixel electrode PX and the counter voltage signal line CL. The capacitive element Cstg has a function of storing the video signal supplied to the pixel electrode PX for a relatively long period and the like.

Here, in the above-mentioned explanation, the semiconductor layers AS are formed in the regions where the thin film transistors TFT are formed. In this embodiment, however, at the time of forming the semiconductor layers AS, semiconductor layers ASI are also simultaneously formed on regions other than the regions where the thin film transistors TFT are formed and above the gate signal lines GL.

In this case, the semiconductor layer ASI is not formed for every pixel but is formed at a rate of, for example, one with respect to a group consisting of a plurality of pixels which are arranged close to each other. The semiconductor layers ASI have, as will become apparent from the explanation described later, a "bottom-up" function for setting a height of an uppermost layer which is brought into contact with the liquid crystal greater at portions where the semiconductor layers ASI are formed than other portions. An advantageous effect obtained by this constitution will be explained later.

On the surface of the transparent substrate SUB1 on which the thin film transistors TFT, the drain signal lines DL, the drain electrodes SD1 and the source electrodes SD2 are formed, a protective film PAS made of SiN, for example, is formed. The protective film PAS is a film which obviates the direct contact of the thin film transistors TFT with the liquid crystal LC and prevents the deterioration of characteristics of the thin film transistors TFT.

Here, the above-mentioned protective film PAS may be constituted of, for example, an organic material layer made of resin or a stacked body which is constituted of an inorganic material layer and an organic material layer.

Further, the counter electrode CT is formed on an upper surface of the protective film PAS. Provided that the counter electrode CT is formed at the left and right sides with respect to the longitudinal direction of the pixel electrode PX basically, the counter electrode CT can perform the function thereof. In this embodiment, however, the counter electrode CT is formed such that the counter electrode CT sufficiently covers the drain signal line DL and the gate signal line GL. In other words, there is provided a pattern in which openings are formed in a center portion of a conductive layer formed on the entire region of the display part (a regional part which is formed by a mass of the respective pixels) while leaving peripheries of the respective pixel regions. This provision is provided for terminating signal electric fields from the drain signal lines DL and the gate signal lines GL to the counter electrode thus preventing the signal electric fields from reaching the pixel electrodes PX.

A material of the counter electrode CT is made of a light transmitting conductive material such as, ITO (Indium Tin Oxide), ITZO (Indium Tin Zinc Oxide), IZO (Indium Zinc Oxide), $SnO_2$ (Tin oxide), $In_2O_3$ (Indium Oxide) or the like thus contributing to the enhancement of the numerical aperture of the pixels.

Further, on the upper surface of the transparent substrate SUB1 on which the counter electrode CT is formed, an orientation film AL is formed such that the orientation film AL also covers the counter electrode CT. The orientation film AL is a film which is directly brought into contact with a liquid crystal LC and the direction of the initial orientation of molecules of the liquid crystal LC is determined based on rubbing formed on a surface of the orientation film AL.

FIG. 2 is a cross-sectional view taken along a line II-II in FIG. 1 and also shows the substrate SUB2 which is arranged to face the above-mentioned substrate SUB1 with the liquid crystal LC therebetween.

On the surface of the substrate SUB1, together with the counter voltage signal lines CL, the insulation film GI, the protective film PAS and the like, the semiconductor layers ASI which are formed separately from the semiconductor layers AS for the thin film transistors TFT are provided. Due to the formation of these semiconductor layers ASI, surfaces of the portions of the semiconductor layers ASI which are brought into contact with the liquid crystal LC are formed higher than other portions by an amount corresponding to a film thickness.

On the other hand, on a liquid-crystal-side surface of the substrate SUB2, a black matrix BM is formed such that the black matrix BM faces the above-mentioned gate signal lines GL, for example. The black matrix BM is provided for enhancing a contrast of a display.

Here, the black matrix BM is formed such that the black matrix BM also sufficiently covers the thin film transistors TFT on the substrate SUB1 side, wherein by interrupting the radiation of an external light to the thin film transistors TFT, the black matrix BM can avoid the degradation of characteristics of the thin film transistors TFT.

On the surface of the substrate SUB2 on which the black matrix BM is formed, color filters CF are formed such that the color filters CF also cover the openings of the black matrix BM. The color filters CF are constituted of, for example, filters of respective colors consisting of red (R), green (G), blue (B), wherein the filters having the same color are formed in common in a group of respective pixel regions which are arranged in parallel in the y direction and the filters having colors in an arrangement of red (R), green (G), blue (B), red (R), are formed in a group of pixel regions which are sequentially arranged close to each other in the y direction.

On the surface of the substrate SUB2 on which the black matrix BM and the color filters CF are formed in this manner, a leveling film OC is formed such that the leveling film OC also covers the black matrix BM and the color filters CF. The leveling film OC is constituted of a resin film which is formed by coating and is provided for eliminating a stepped portion which becomes apparent due to the formation of the black matrix BM and the color filters CF.

Further, on an upper surface of the leveling film OC, to allow the substrate SUB2 to ensure a uniform gap (for example, 4 μm) with respect to the substrate SUB1, spacers SP are formed. The spacers SP are formed as columnar projection bodies (columnar spacers) which are formed by performing the selective etching of a resin film, for example, of a substantially uniform film thickness formed on the leveling film OC. Accordingly, the respective spacers SP which are formed in this manner can be constituted as projection bodies having the substantially uniform height.

In this embodiment, the spacers SP are formed at a rate of, for example, one for each pixel and these spacers SP are formed at positions corresponding to the respective pixels. That is, with respect to the pixels in which the semiconductor layers ASI are formed among the above-mentioned respective pixels, the spacers SP are arranged on the orientation film AL over the semiconductor layers ASI of the pixels such that top portions of the spacers SP face the semiconductor layers ASI in an opposed manner and, at the same time, other spacers SP which are arranged around these spacers SP are also formed on the corresponding positions.

Accordingly, in a state that pressure of a given value or more is not applied between the substrate SUB2 and the substrate SUB1, as shown in FIG. 1, with respect to the pixels provided with the semiconductor layers ASI, the spacers SP provided to the pixels are brought into contact with the substrate SUB1 side (to express more accurately, brought into contact with the orientation film AL), while other spacers SP around these spacers SP are in a state that other spacers SP are not brought into contact with the substrate SUB1 side.

Here, as mentioned above, the above-mentioned semiconductor layers ASI are formed at a rate of, for example, one for a group consisting of a plurality of pixels which are arranged close to each other and this implies that one spacer SP is brought into contact with the substrate SUB1 with respect to the group of pixels. Accordingly, in the inside of the display part which is formed of the mass of the pixels, a large number of the spacers SP which are brought into contact with the substrate SUB1 side are arranged in a scattered manner and these spacers SP perform the function of maintaining the gap in a state that the pressure of the given value or more is not applied between the substrate SUB2 and substrate SUB1.

Here, the reason that the expression "state in which the pressure of the given value or more is not applied between the substrate SUB2 and the substrate SUB1" is used is that there exists a case in which an excessive pressure is applied between the substrate SUB2 and the substrate SUB1 such as a case in which a user pushes the liquid crystal display device with his finger. In this case, the spacers SP which are arranged to face the above-mentioned semiconductor layer ASI receive the elastic deformation and spacers SP other than these spacers SP are brought into contact with the substrate SUB1 side. As a result, when the excessive pressure is applied, all spacers in the region are added to maintain the gap and hence, the pressure per one spacer is dispersed. Accordingly, it is possible to prevent the rupture of the spacers SP on the semiconductor layers ASI.

In view of the above, when the excessive pressure is applied between the substrate SUB2 and the substrate SUB1, all spacers SP perform the function thereof, while when the excessive pressure is not applied between the substrate SUB2 and the substrate SUB1, only some spacers SP out of the respective spacers perform the function thereof.

Accordingly, in the latter case, the friction resistance between the substrate SUB1 and the substrate SUB2 can be largely reduced and hence, even when the displacement of the substrate SUB2 is generated with respect to the substrate SUB1 in the planner direction, a force which returns the substrate SUB2 still remains whereby it is possible to obviate a phenomenon that the displacement is not eliminated.

This may be also construed that two types of spacers, that is, the spacers for normal use and the spacers for emergency use are provided.

Further, two types of spacers SP which have different functions in this manner can be constituted by forming the above-mentioned semiconductor layers ASI at the time of forming the semiconductor layers AS of the thin film transistors TFT. Accordingly, there is no possibility that the manufacturing cost is increased.

Here, on a surface of the above-mentioned leveling film OC, in a state that surfaces of the spacers SP are also included, the orientation film AL is formed. The orientation film AL is a film which is directly brought into contact with the liquid crystal LC and the direction of the initial orientation of molecules of the liquid crystal LC is determined based on the rubbing formed on the surface thereof.

In the constitution shown in the drawing, the counter electrode CT is constituted such that the counter electrode CT sufficiently covers at least the gate signal lines GL and the drain signal lines DL. In this case, around surfaces of the substrate with which top portions of the columnar spacers SP are brought into contact, the counter electrode CT having the large area is formed. Accordingly, the counter electrode CT functions as a hard pad with respect to the columnar spacers SP and, due to the rigidity of the hard pad, the columnar spacers SP which are brought into contact with these portions can be easily elastically deformed.

In view of the above, when the counter electrode CT having the above-mentioned constitution is not formed, a hard pad having a relatively large rigidity such as a metal made hard pad may be formed. In this case, with respect to the surfaces of the substrate with which the top portions of the columnar spacers SP are brought into contact, it is preferable to form the hard pad on the surfaces or around these surfaces and, at the same time, to make the area of the hard pad greater than the area of top portions of the columnar spacers.

It is needless to say that, by only adopting the constitution in which the semiconductor layers ASI are arranged at positions which face the columnar spacers and the semiconductor layers ASI which are not arranged on the positions, even when the displacement is generated between the substrate SUB1 and the substrate SUB2, the displacement can be easily restored and it is possible to obtain an advantageous effect to prevent the rupture of the spacers on the semiconductor layers ASI.

Further, in the illustrated constitution, although the constitution in which the pixel electrodes PX and the counter electrode CT is formed on the same substrate SUB1 as an example of the liquid crystal display device is adopted, even with the constitution in which the pixel electrodes PX are formed on the substrate SUB1 and the counter electrode CT is formed on the substrate SUB2, by adopting the constitution in which the semiconductor layers ASI are arranged at positions which face the columnar spacers and the semiconductor layers which are not arranged on the positions, even when the displacement is generated between the substrate SUB1 and the substrate SUB2, the displacement can be easily restored and it is possible to obtain an advantageous effect to prevent the rupture of the spacers.

Further, as mentioned previously, with respect to the columnar spacers SP which are formed on the substrate SUB2, there exist the columnar spacers SP which are brought into contact with the substrate SUB1 and the columnar spacers SP which are not brought into contact with the substrate SUB1. In achieving such a constitution, it is desirable that the height of the substrate SUB1 which faces the columnar spacers SP is set such that the step difference or the difference in height between surfaces of portions with which the columnar spacers SP are brought into contact and surfaces of portions with which the columnar spacers SP are not brought into contact is within a range of 0.06 µm to 0.18 µm.

Here, the lower limit value 0.06 µm is determined in view of the correction which becomes necessary due to the difference in the thermal expansion of the liquid crystal at a room temperature (for example, 25° C.) and a high temperature (for example, 40° C.). That is, this value can maintain the negative pressure in the inside of the display device even when the sizes of the substrates SUB1, SUB2 are increased. On the other hand, the upper limit value 0.18 µm is a value necessary for generating a phenomenon that when the load is concentrated, the columnar spacers SP which are not brought into contact with the substrate SUB1 in a usual state are brought into contact with the substrate SUB1 to disperse the load before the columnar spacers SP which are brought into contact with the substrate SUB1 in a usual state are ruptured under pressure.

Further, a diameter of the columnar spacers SP which are not brought into contact with the substrate SUB1 in a usual state may be set greater than a diameter of the columnar spacers SP which are brought into contact with the substrate SUB1 in a usual state. In this case, it is possible to enhance the restoring ability of the substrate SUB2 with respect to the displacement of the substrate SUB2 with respect to the substrate SUB1 and, at the same time, it is possible to make the columnar spacers SP hardly broken even when the excessive load is applied.

In any one of the above-mentioned embodiments, the spacers SP are formed on the substrate SUB2 side. However, by providing constitutional parts which can replace the above-mentioned semiconductor layers ASI to the substrate SUB2 side, the spacers SP may be formed on the substrate SUB1 side.

Figure 3:
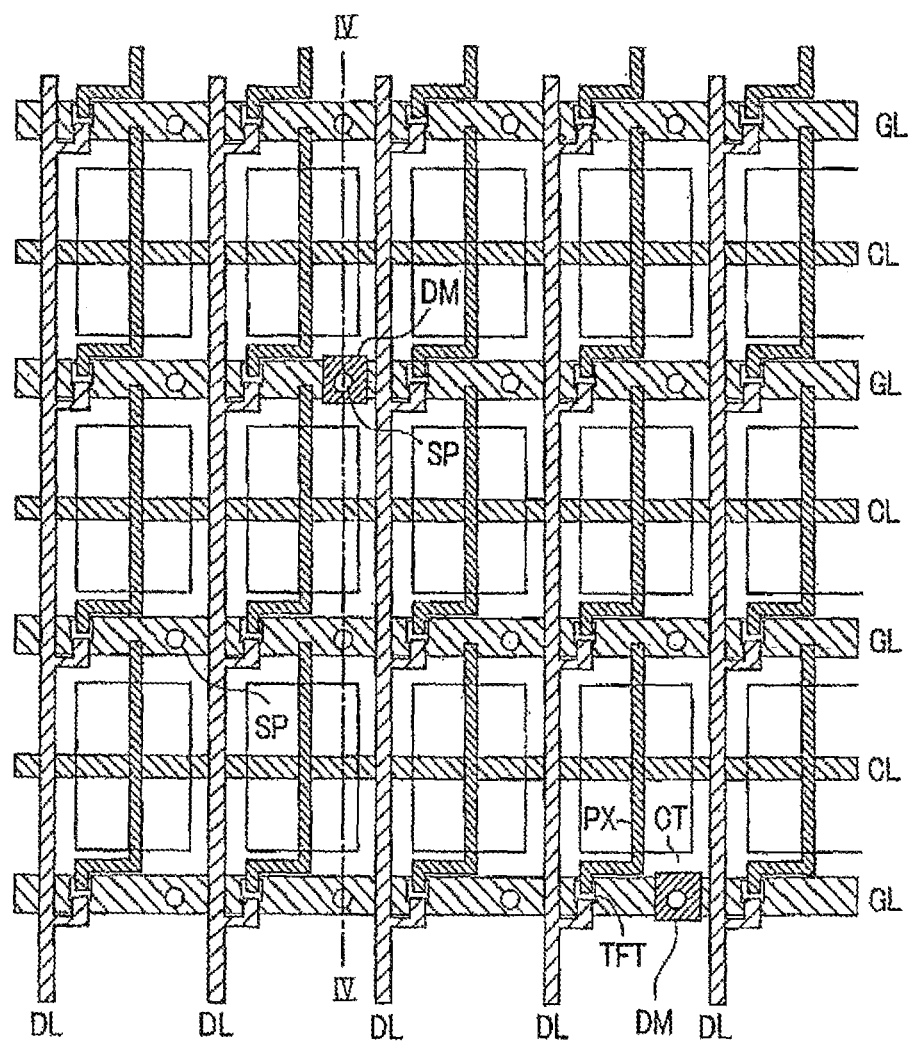
FIG. 3 is a plan view showing another embodiment of the constitution of the pixels of the liquid crystal display device according to the present invention.
Figure 4:
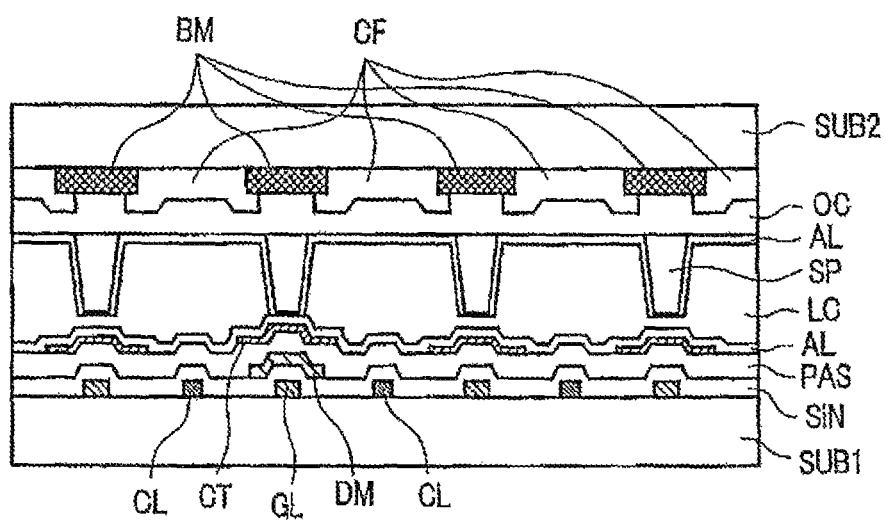
FIG. 4 is a cross-sectional view taken along a line IV-IV in FIG. 3.

Further, in any one of the above-mentioned embodiments, the relatively high portions are formed on the surface of the substrate SUB1 which is brought into contact with the liquid crystal using the semiconductor layers ASI. However, it is needless to say that it is possible to use other material layers which replace the semiconductor layers ASI and have some thickness. FIG. 3 is a plan view showing such a constitution, wherein other material layers in place of the semiconductor layer ASI are indicated by a symbol DM. With the use of such material layers DM, it is possible to obtain an advantageous effect that the thickness can be arbitrarily determined. In this case, it is needless to say that the material layers DM can be simultaneously formed when the material layers are formed on the surface of the substrate SUB1. As an example, the material layers DM may be simultaneously formed with the material layers of the drain signal lines DL.

As another example, the material layers DM may be formed by protective film PAS or insulation film GI. In this case, protective film PAS or insulation film GI make thicker at some portions out of area where face to the spacer than other portions out of area where face to the spacer. Half-exposure method is suitable in this case as no additional photo process necessary.

Figure 5:
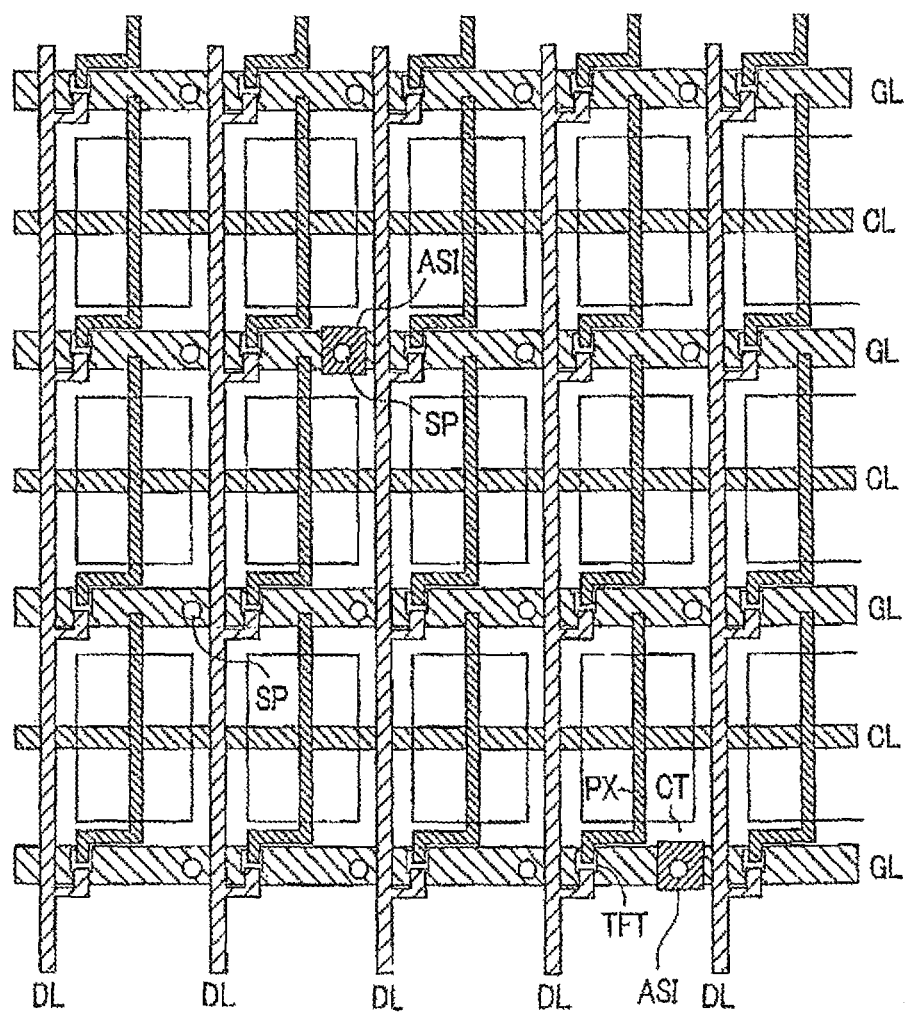
FIG. 5 is a plan view showing still another embodiment of the constitution of the pixels of the liquid crystal display device according to the present invention.

Further, as shown in FIG. 5, the spacers SP which are arranged to face the semiconductor layers ASI in an opposed manner and the spacers SP which are not arranged to face the semiconductor layers ASI in an opposed manner may be arranged at positions different from each other. This is because that the portions on which the semiconductor layers ASI are formed require some spaces around the portions.

The above-mentioned respective embodiments can be used in a single form or in combination. This is because it is possible to obtain the advantageous effects of the respective embodiments in a single form or synergistically.

The invention claimed is:
1. A liquid crystal display device comprising:
a first substrate and a second substrate with a liquid crystal layer therebetween;
a plurality of spacers disposed on the first substrate; and
a plurality of gate signal lines and a plurality of drain signal lines, the gate signal lines and the drain signal lines being disposed on the second substrate, wherein the plurality of spacers include a first spacer and a second spacer,
wherein a projection portion is disposed on the second substrate and counters the first spacer,
wherein the first spacer and the second spacer counter the plurality of gate signal lines, wherein the projection portion includes a semiconductor layer disposed on a corresponding one of the gate signal lines, and a metal layer stacked on the semiconductor layer.

2. The liquid crystal display device according to claim 1, wherein the first spacer and the second spacer are substantially equal in height.

3. A liquid crystal display device comprising:
a first substrate and a second substrate with a liquid crystal layer therebetween;
a plurality of gate signal lines and a plurality of drain signal lines, the gate signal lines and the drain signal lines being disposed on the second substrate,
a plurality of pixel regions defined by the gate signal lines and the drain signal lines,
a plurality of spacers disposed on the first substrate, each of the plurality of spacers countering each of the gate signal lines,
a projection portion disposed on the second substrate, the projection portion being arranged on one of the gate signal lines, and formed by at least a semiconductor layer and a conductive layer, the conductive layer being disposed on the semiconductor layer,
wherein the plurality of spacers include a first spacer and a second spacer, a region where the first spacer is disposed corresponds to a region where the projection portion is disposed in a plan view, and a region where the second spacer is disposed does not correspond to the region where the projection portion is disposed in a plan view.

4. The liquid crystal display device according to claim 3, wherein the plurality of spacers are columnar spacers.

5. The liquid crystal display device according to claim 3, wherein the first spacer and the second spacer are substantially equal in height.

6. The liquid crystal display device according to claim 3, wherein a plurality of the projection portion are disposed on the second substrate, and
a number of the plurality of the projection portion is smaller than a number of the plurality of spacers.

7. The liquid crystal display device according to claim 3, wherein the region where the first spacer is disposed overlaps the region where the projection portion is disposed in a plan view, and
the region where the second spacer is disposed does not overlap the region where the projection portion is disposed in a plan view.

* * * * *